United States Patent [19]

Küppers

[11] Patent Number: 4,658,657
[45] Date of Patent: Apr. 21, 1987

[54] MASS FLOW METER

[76] Inventor: Karl Küppers, St.-Peter-Strasse, D-8060 Dachau, Fed. Rep. of Germany

[21] Appl. No.: 734,279
[22] PCT Filed: Aug. 16, 1984
[86] PCT No.: PCT/EP84/00252
  § 371 Date: Apr. 16, 1985
  § 102(e) Date: Apr. 16, 1985
[87] PCT Pub. No.: WO85/00882
  PCT Pub. Date: Feb. 28, 1985

[30] Foreign Application Priority Data
Aug. 16, 1983 [DE] Fed. Rep. of Germany ....... 3329544

[51] Int. Cl.$^4$ .............................................. G01F 1/84
[52] U.S. Cl. .............................................. 73/861.38
[58] Field of Search ............. 73/861.38, 861.12, 32 A, 73/861.37

[56] References Cited
U.S. PATENT DOCUMENTS 3,108,475 10/1963 Henderson ........................ 73/861.38
3,132,512 5/1964 Roth ................................ 73/861.38
4,252,028 2/1981 Smith et al. ..................... 73/861.38

Primary Examiner—Donald O. Woodiel
Attorney, Agent, or Firm—Robert W. Fiddler

[57] ABSTRACT

A Coriolis-force mass flow meter is proposed, which is clamped at one side in a rigid mounting, has a tubular loop through which a test medium is flowing and which, relative to the mounting, is capable of oscillating itself about a particular axis of oscillation and can be given a rotary oscillation about a specified axis of rotation by an exciter system. In the state of the art, the axis of oscillation and the axis of rotation essentially coincide. In contrast to this, the special feature of the inventive flow meter consists therein that said axes have an angle that is significantly different from 0°, the axis of rotation having a directional component parallel to the plane of the tubular loop. In this way, a significant improvement in respect to signal generation is achieved. In the drawing, (1) refers to the tubular loop, (2) to the loop mounting, (3) to the support of the loop mounting, (5) to the exciter system, SA to the axis about which tubular loop (1) is capable of oscillating, and DA to the axis of the excited rotary oscillation.

14 Claims, 4 Drawing Figures

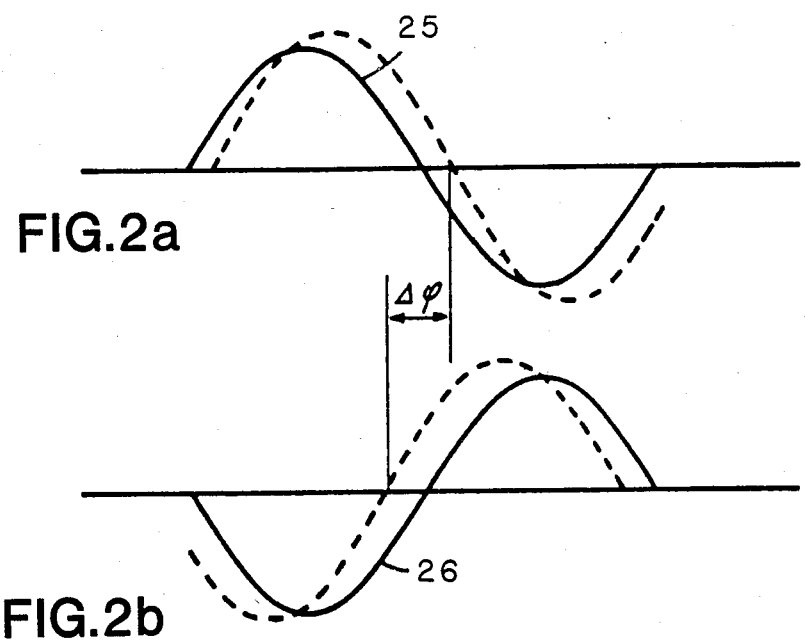
FIG.2a
FIG.2b
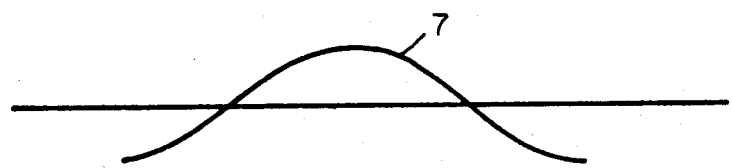
FIG.2c

MASS FLOW METER

SUMMARY OF INVENTION

The invention relates to mass flow meter.

Known mass flow meters have been formed with a tubular loop of a U shape with parallel side arms clamped at one end to a loop mounting. A cross arm connects the side arms. The tubular loop is excited by a driving system into a primary oscillation which is a rotary oscillation about the axis of oscillation, and the axis of rotation and axis of oscillation coincide. It is an object of the invention to provide a mass flow meter of the type formed with the U shaped tubular loop as above discussed, which is capable of supplying significantly larger measuring signals than previously available with mass flow meters of this type, and permitting reliable measurement of significantly smaller flows. In the improved mass flow meter, the tubular loop and, with it, the part of the tubular loop, which is practically always present and corresponds to the cross arm of the known flow meters, is excited by the exciter system to a—primary—rotary oscillation about the axis of rotation. This primary, rotary oscillation, in conjunction with the mass flow rate, gives rise in said part of the tubular loop to Coriolis forces, which result in translatory deflection of this tubular loop part, which is proportional to the flow, displaced by 90° relative to the exciting oscillation and superimposed on the primary rotary oscillation. The translatory deflection manifests itself as an oscillation of said tubular loop part about the axis of oscillation of the tubular loop, and the flexural resistance of the tubular loop about the axis of oscillation is significantly smaller than the flexural resistance about the axis of the secondary oscillation, exhibited by the tubular loop of the known flow meters. Thus, a significantly larger measuring signal is obtained than attained in flow meters having dimensions of the same order of magnitude permitting the use of thicker tubes for the same measuring range.

BRIEF DESCRIPTION OF DRAWINGS

The invention is explained in greater detail below by means of examples of the operation shown in the drawing.

FIG. 2 shows, as a function of time, the course and the mutual phase position of the oscillations, executed by the side arms or the cross arm of the tubular loop of the flow meter of FIG. 1;

DETAILED DESCRIPTION

Figure 1:
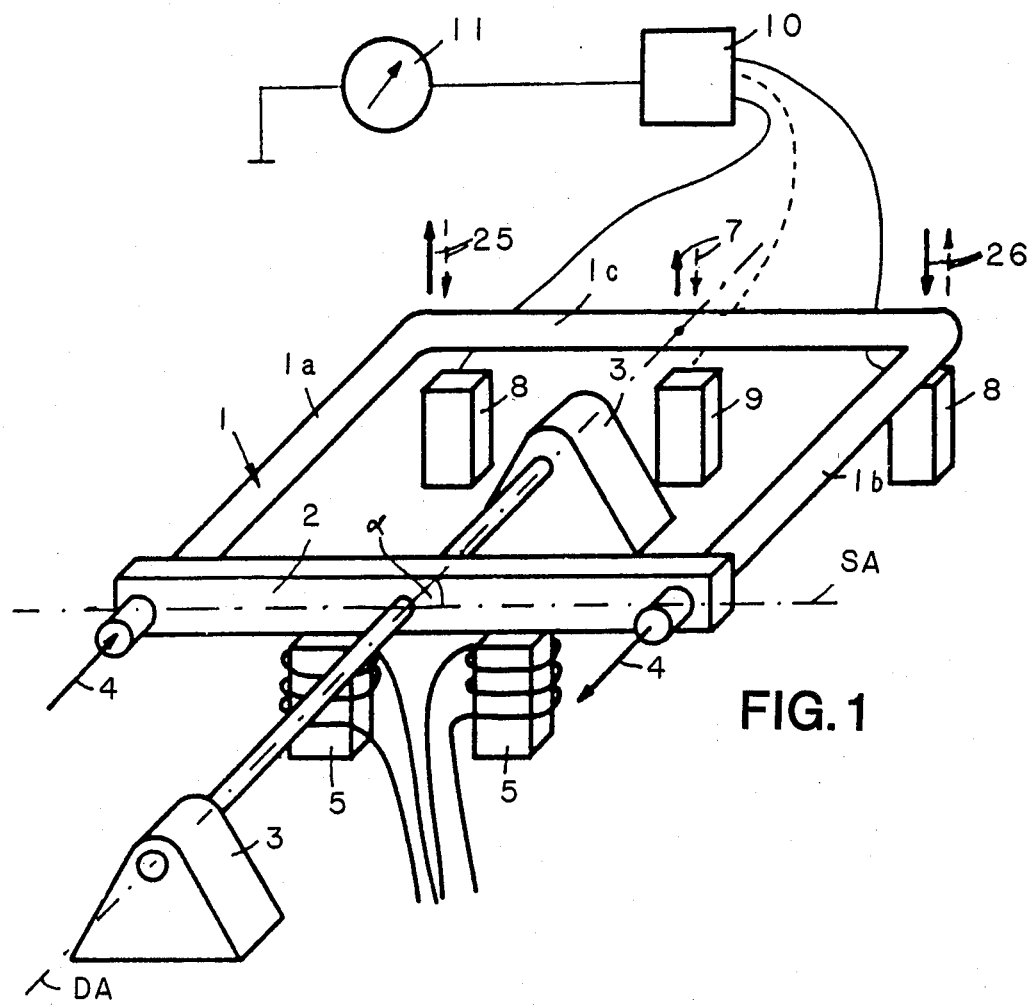
FIG. 1 shows the mass flow meter in a simplified representation in perspective view for explaining the basic principle.

The flow meter of FIG. 1 has a tubular loop 1, one side of which is clamped into a rigid loop mounting 2. The flow meter can be deflected elastically relative to the loop mounting 2 and transversely to its plane about an axis of oscillation SA that is defined by the clamping. The tubular loop 1 forms a half turn and comprises two side arms 1a and 1b, which extend at a spaced distance from each other from the loop mounting 2, and one cross arm 1c, which connects these at a distance from the mounting 2.

The tube mounting 2 is mounted, so that it can rotate about the axis of rotation DA, in a support 3 that, like the axis of rotation DA, lies in the plane of the tubular loop. The axis of rotation DA extends parallel to side arms 1a and 1b of tubular loop 1, forms an angle of about 90° with the axis of oscillation SA and intersects cross arm 1c of tubular loop 1 essentially in the center.

The test medium, usually a fluid, is supplied to the tubular loop 1 at one clamped end and emerges from this loop at the other clamped end, as indicated by arrows 4 in FIG. 1. In so doing, it flows, in order, through side arm 1a, cross arm 1c and side arm 1b.

Immediately next to the loop mounting 2, which consists of a magnetic material here, there is arranged an electromagnetic exciter system 5, which displaces the loop mounting 2 and, by way of this, the tubular loop 1 into a primary rotary oscillation about the axis of rotation DA. As long as the test medium is at rrest in tubular loop 1, that is, as long as the flow has the value of zero, side arms 1a execute essentially sinoidal oscillations at the ends adjacent to cross arm 1c. These oscillations are shown in FIG. 2, (a and b), by the unbroken curves, which are mutually displaced by 180°, that is, their phases are opposite. In FIG. 1, these oscillations are indicated by arrows 25 and 26, the unbroken arrows on the one hand and the broken arrows forming pairs that belong together in respect to time.

When the test medium flows through tubular loop 1, it moves in cross arm 1c first of all towards the axis of rotation DA and then away from it. As a result, Coriolis forces arise in cross arm 1c under the influence of the rotary oscillations taking place about the axis of rotation DA. The magnitude of the Coriolis forces is proportional to the flow and these forces endeavor to deflect arm 1c about the axis of oscillation SA, the direction of the deflection changing periodically with rotary oscillation of the tubular loop 1 about the axis of rotation DA. This translatory deflection of cross arm 1c, which manifests itself at tubular loop 1 as a rotary oscillation about the axis of oscillation SA with an amplitude proportional to the flow, is shifted by 90° relative to the primary rotary oscillation of the tubular loop 1 about the axis of rotation DA, the oscillation that is caused by the exciter system 5. This is shown in section c) of FIG. 2. In FIG. 1, this oscillation is indicated by arrows 7.

The oscillation from the Coriolis force, which is proportional to the flow, is superimposed on the fundamental oscillations, shown as unbroken lines in FIGS. 2a and 2b, in the manner indicated by a broken curve and leads to a phase displacement $\Delta\phi$ between the resulting oscillations, which the side arms 1a and 1b carry out at the ends adjacent to the cross arm, the phase displacement being exactly proportional to the Coriolis force and therefore to the flow.

About the axis of oscillation SA, about which the Coriolis forces in the cross arm 1c of tubular loop 1 bring about the secondary osscillation, tubular loop has basically a slight flexural resistance, which naturally depends on the nature of the tube, so that even thick tubes can supply an unambiguously measurable deflection, as indicated by arrow 7, for relatively slight flows or correspondingly thinner tubes can still indicate extremely small flows with an unambiguously measurable deflection.

The deflection of tube 1 is measurable in various ways. FIG. 1f shows two different measuring devices, which are suitable for this purpose. One of these devices is labelled 8 and measures the phase displacement Δφ between the oscillations carried out by those ends of side arms 1a and 1b of tubular loop 1, which are adjacent to cross arm 1c. The second, alternatively usable measuring device is labelled 9 and measures the magnitude of the deflection of cross arm 1c, as indicated by arrow 7, at the point of intersection of this arm with the axis of rotation DA, that is, it measures the amplitude of the oscillation as shown in FIG. 2c. A signal proportional to the flow is generated by an electronic device 10 from the displacement of the phase or from the amplitude of the deflection and is indicated by indicating instrument 11.

A different possibility of measuring the flow through tubular loop 1 on the basis of the Coriolis forces arising in cross arm 1c, which is subject to the primary rotary oscillations, consists of providing a device, which counteracts the deflections of the cross arm at the point of intersection with the axis of rotation DA by generating a counterforce that compensates for the respective deflection force in such a manner, that the deflections are practically prevented, the measuring device then measuring the magnitude of the counterforce or the physical quantity that produces the counterforce, such as the current when the counterforce is generated electromagnetically.

Without special, additional facilities, a flow meter, constructed as shown in FIG. 1, would exert considerable inertial forces on the housing, in which the individual parts of the flow meter are arranged and held. Versions of the flow meter, designed basically as in FIG. 1 but in each case with facilities to prevent this, are shown in FIGS. 3 and 4.

Figure 3:
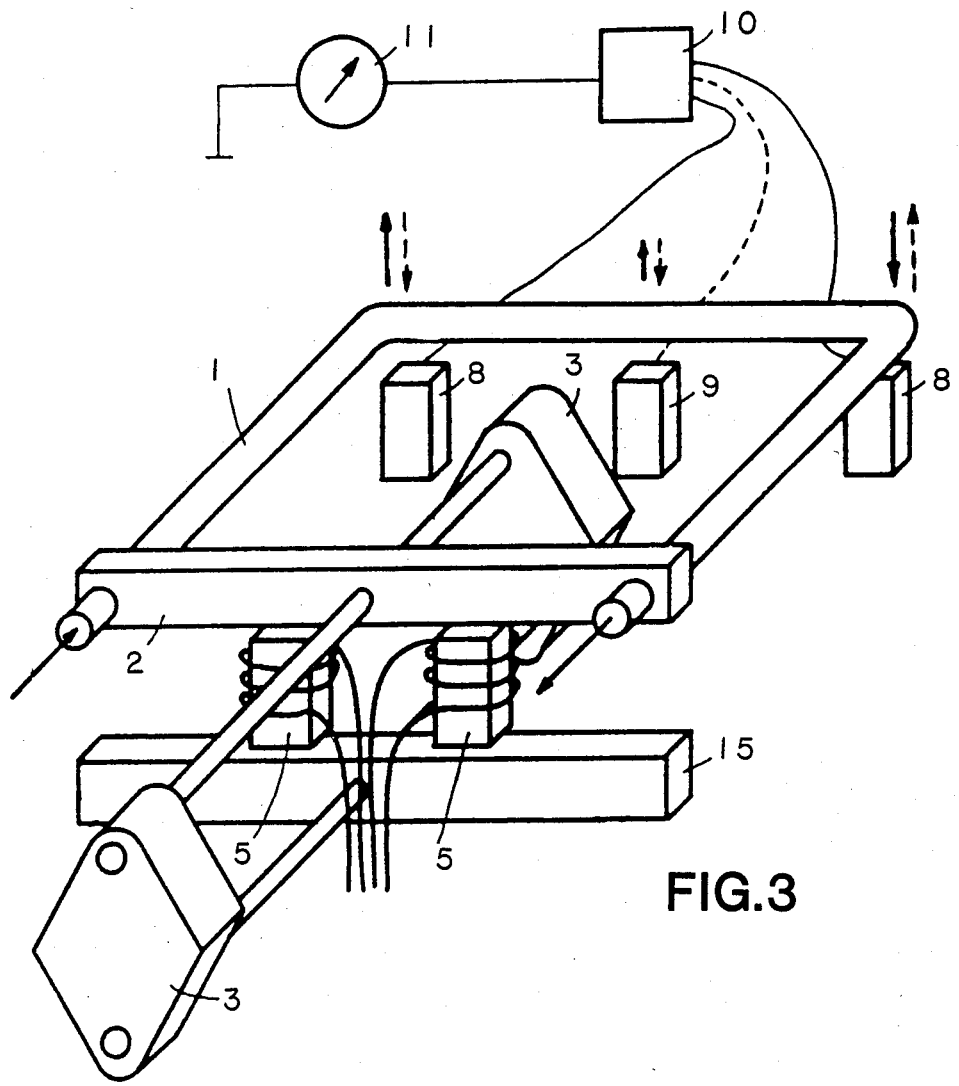
FIG. 3 is a first practical design of the inventive mass flow meter in schematic representation in perspective view.
Figure 4:
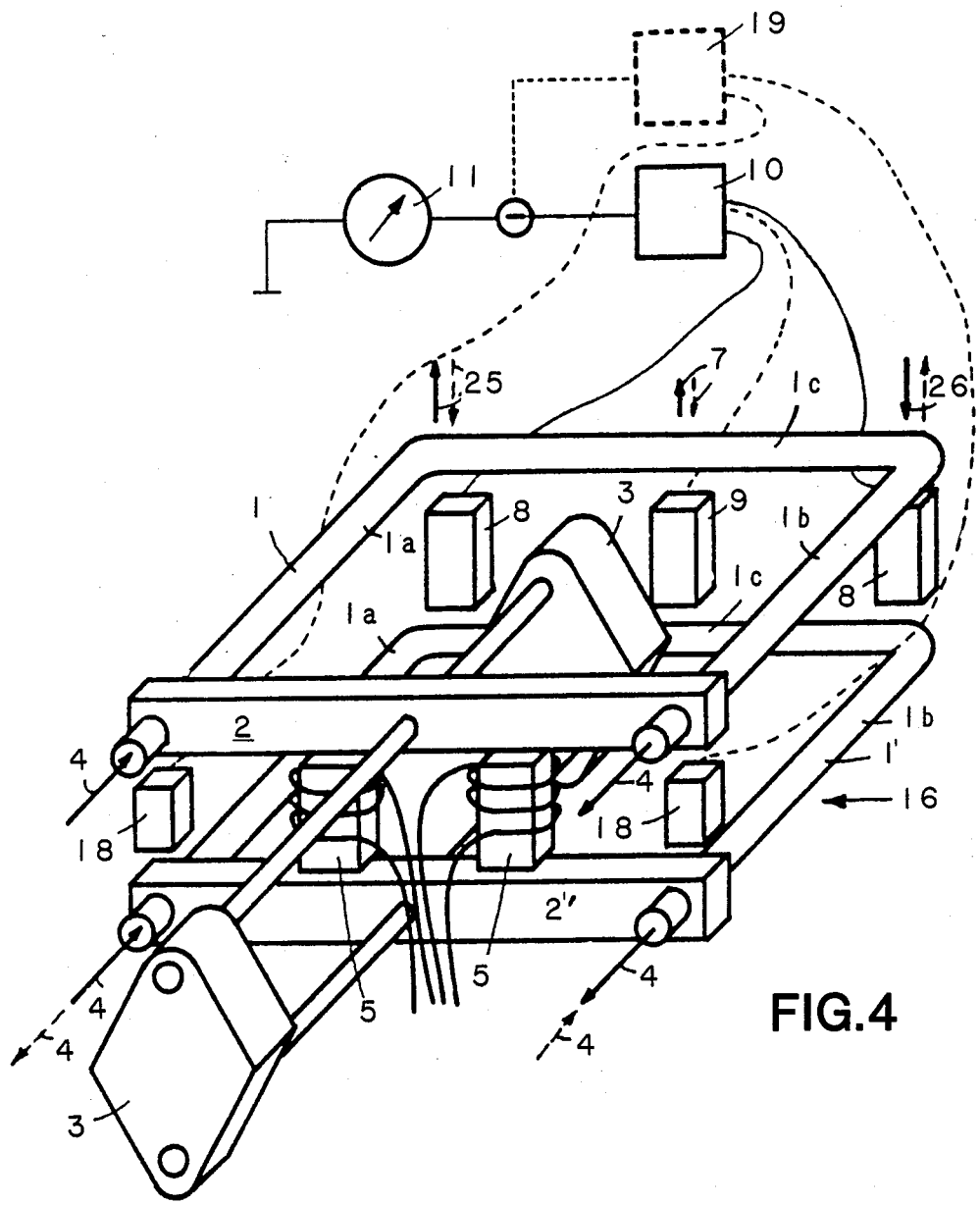
FIG. 4 is a second practical design in schematic representation and perspective view.

In the two constructions of FIG. 3 on the one hand and FIG. 4 on the other, a balancing of masses is provided. The inertial forces, caused by the oscillatory motion of the loop mounting 2 and the tubular loop 1 and acting on the support 3 of the loop mounting 2, are compensated for by a mass balancing system 15 or 16, which oscillates with the same frequency but the opposite phase and exerts a counter-action on this support 3. In the construction of FIG. 3, this mass balancing system is a beam 15, rotatably supported, like mounting 2, at support 3 and displaced by the exciter system 5 to this oscillation of opposite phase with a flywheel effect about its axis of rotation that is parallel to the axis of rotation DA, which compensates for the flywheel effect of the oscillating flow-metering part. In the construction of FIG. 4, these facilities consists of an identical repetition of the tubular loop 1 with the associated loop mounting 2. In the construction of FIG. 4, the phase of the oscillation of the repeated tubular loop 1' with the associated mounting 2' is also opposite to that of tubular loop 1 and its mounting 2.

On account of the two tubular loops 1 and 1', present in the construction of FIG. 4 and identical with one another, this construction also offers the possibility, provided that the measuring device 8 or 9 is designed appropriately, of measuring the sum or the difference of the individual through-puts through tubular loop 1 on the one hand and through tubular loop 1' on the other. For example, owing to the fact that a particular test medium is sent in series through tubular loops 1 and 1', the measurement signal is doubled when the sum is measured. An example of the difference measurement is the supply of fuel to an engine through one tubular loop and the discharge of excess fuel, not consumed by the engine, through the other tubular tube. By these means the fuel, consumed by the engine, is indicated as the result of the difference measurement.

For all of the embodiments illustrated above, the support 3, the exciter system 5 and the measuring devices 8 and 9 can be connected rigidly with the housing of the flow meter and, in so doing, can also be coupled rigidly to each other.

For the specific embodiments described however, the support 3 for the loop mounting can also be spring mounted on the housing of the flow meter. The spring mounting has the effect of shielding the measuring system from vibrations of the housing coming from the outside or from other external influences. In the latter case, it is advisable to couple the exciter system 5 and the measuring devices 8 and 9 rigidly with the loop support 2 or the loop supports 2 and 2' and not with the housing.

FIG. 4 also shows yet a second measuring device 18, which functions much like measuring device 8 but, contrary to the latter, measures the motion of the loop mounting 2 and/or 2' relative to the housing of the mass flow meter and the signal of which can be used to compensate for possible zero-point errors due to external influences. In the version of FIG. 4, the compensating signal is generated in an electronic device 19 and superimposed compensatingly on the signal from electronic device 10. In this manner, interference with the measuring system, originating from the housing of the flow meter, can be eliminated practically completely.

The measuring system 18 is preferably connected rigidly with the housing of the flow meter.

The preceding specifications and the attached drawing are an account of the best means known at the present time of carrying out the invention.

I claim:

1. Mass flow meter with at least one tubular loop, through which a test medium is flowing and which is clamped at one side into a rigid loop mounting, forms at least a half turn and can be elastically deflected relative to the loop mounting transversely to the plane of the loop mounting about an axis of oscillation, that is defined by the clamping, moreover with an exciter system, which imposes a primary oscillation about a specified axis of rotation on the tubular loop in operation, the oscillatory motion, in conjunction with the mass flow through the loop, giving rise to Coriolis forces in this loop, which act on the loop in proportion to the flow, and with a device for measuring the action that is proportional to the flow, the tubular loop consisting of two lateral arms extending at opposite distances from the loop mounting as well as one cross arm connecting these lateral arms at a distance from the mounting, the axis of rotation (DA) intersecting or crossing the axis of oscillation (SA) at an angle significantly different from 0° and moreover having a directional component parallel to the plane of the loop and the axis of rotation intersecting the cross arm of the tubular loop or crossing it at a minimum distance, wherein there is a device for suppressing deflections (7) of the cross arm (1c) of the tubular loop (1, 1') at the point of intersection with the axis of rotation (DA) by generating a counterforce to compensate for the respective deflection force, the measuring device measuring the magnitude of the counterforce or a physical quantity that gives rise to this counterforce.

2. Mass flow meter as defined in claim 1 wherein the axis of rotation (DA) crosses the axis of oscillation at an angle (a) of about 90° or at a minimum distance.

3. Mass flow meter as defined in claim 1 wherein the loop mounting (2, 2′) is supported in a support (3) so that it can rotate about the axis of rotation (DA) and wherein the exciter system (5) gives the loop mounting (2, 2′) and, over this, the tubular loop (1, 1′) a rotary oscillation about the axis of rotation (DA).

4. Mass flow meter as defined in claim 1 wherein the side arms (1a, 1b) of the tubular loop (1, 1′) run essentially parallel to each other and extend essentially perpendicular to the axis of oscillation (SA) and the cross arm (1c) is essentially perpendicular to the side arms (1a, 1b).

5. Mass flow meter as defined by claim 4, wherein the new axis or rotation (DA) intersects or crosses the cross arm (1c) in the center.

6. Mass flow meter as defined in claim 1 wherein the inertial forces, caused by the oscillatory motion of the loop mounting (2) and the tubular loop (1), and acting on the support (3) of the loop mounting (2), are compensated for by mass balancing system (15, 16) exerting a counteraction on this support (3) and oscillating with the same frequency but opposite phase.

7. Mass flow meter as defined in claim 6, wherein the new mass balancing system (16) comprises an identical repetition of the tubular loop (1) with the associated loop mounting (2).

8. Mass flow meter as defined in claim 7, wherein the new test medium flows through the two tubular loops (1, 1′) in the same direction, so that the measuring device (8, 9) measures the sum of the two individual flows.

9. Mass flow meter as defined in claims 7, wherein the new test medium flows through the two tubular loops (1, 1′) in the opposite direction, so that the measuring device (8, 9) measures the difference between the two flows.

10. Mass flow meter as defined in claim 6 wherein the support (3) of the loop mounting (2, 2′) is spring-mounted at the housing of the flow meter.

11. Mass flow meter as defined in claim 6 wherein the measuring device (8, 9) is arranged so as to be stationary with respect to the support (3) of the loop mounting (2, 2′).

12. Mass flow meter as defined in claim 1 wherein a second measurement device (18) is provided, which measures the motion of the loop mounting (2, 2′) relative to the support (3) or relative to the housing of the mass flow meter and whose signal is used to compensate for a possible zero point error due to external influences.

13. Mass flow meter with at least one tubular loop, through which a test medium is flowing and which is clamped at one side into a rigid loop mounting, forms at least a half turn and can be elastically deflected relative to the loop mounting transversely to the plane of the loop mounting about an axis of oscillation, that is defined by the clamping, moreover with an exciter system, which imposes a primary oscillation about a specified axis of rotation on the tubular loop in operation, the oscillatory motion, in conjunction with the mass flow through the loop, giving rise to Coriolis forces in this loop, which act on the loop in proportion to the flow, and with a device for measuring the action that is proportional to the flow, the tubular loop consisting of two lateral arms extending at opposite distances from the loop mounting as well as one cross arm connecting these lateral arms at a distance from the mounting, the axis of rotation (DA) intersecting or crosssing the axis of oscillation (SA) at an angle significantly different from 0° and moreover having a directional component parallel to the plane of the loop and the axis of rotation intersecting the cross arm of the tubular loop or crossing it at a minimum distance, wherein the measuring device (8) measures the mutual phase position of the oscillation, which the side arms (1a, 1b) of the tubular loop (1, 1′) execute at a distance from the loop mounting (2), preferably in the vicinity of the cross arm (1c) of the tubular loop (1, 1′).

14. Mass flow meter with at least one tubular loop, through which a test medium is flowing and which is clamped at one side into a rigid loop mounting, forms at least a half turn and can be elastically deflected relative to the loop mounting transversely to the plane of the loop mounting about an axis of oscillation, that is defined by the clamping, moreover with an exciter system, which imposes a primary oscillation about a specified axis of rotation on the tubular loop in operation, the oscillatory motion, in conjunction with the mass flow through the loop, giving rise to Coriolis forces in this loop, which act on the loop in proportion to the flow, and with a device for measuring the action that is proportional to the flow, the tubular loop consisting of two lateral arms extending at opposite distances from the loop mounting as well as one cross arm connecting these lateral arms at a distance from the mounting, the axis of rotation (DA) intersecting or crossing the axis of oscillation (SA) at an angle significantly different from 0° and moreover having a directional component parallel to the plane of the loop and the axis of rotation intersecting the cross arm of the tubular loop or crossing it at a minimum disstance, wherein the measuring device (9) measures the flow-proportional deflection (7) of the cross arm (1c) of the tubular loop (1) at the point of intersection with the axis of rotation (DA).

* * * * *